(12) United States Patent
Goleski et al.

(10) Patent No.: US 8,931,611 B2
(45) Date of Patent: Jan. 13, 2015

(54) CONNECTED ASSEMBLY OF TWO SHAFTS AND A CLUTCH HOUSING

(71) Applicant: Ford Global Technologies, LLC, Dearborn, MI (US)

(72) Inventors: Gregory D. Goleski, Rochester Hills, MI (US); Steven G. Thomas, Bloomfiled Hills, MI (US); Jeffrey E. Maurer, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 13/659,044

(22) Filed: Oct. 24, 2012

(65) Prior Publication Data

US 2014/0110215 A1    Apr. 24, 2014

(51) Int. Cl.
*F16D 25/10* (2006.01)
*F16D 1/072* (2006.01)

(52) U.S. Cl.
USPC .................................. 192/110 R; 29/525

(58) Field of Classification Search
USPC ........................................ 192/85.25
See application file for complete search history.

(56) References Cited

U.S. PATENT DOCUMENTS

| 4,376,333 | A | * | 3/1983 | Kanamaru et al. | 29/432 |
| 4,416,564 | A | * | 11/1983 | Billet et al. | 403/282 |
| 4,640,152 | A | * | 2/1987 | Quick et al. | 475/116 |
| 2007/0066440 | A1 | * | 3/2007 | Kitahara et al. | 475/331 |

* cited by examiner

*Primary Examiner* — Richard Lorence
(74) *Attorney, Agent, or Firm* — James Dottavio; MacMillan, Sobanski & Todd, LLC

(57) ABSTRACT

An assembly of transmission components includes a first shaft including first and second surfaces, and axial cutting-spline teeth on the second surface, a second shaft connected by a press fit to first shaft, and a clutch hub connected by a press fit to the second shaft and engaged with the cutting-spline teeth.

16 Claims, 3 Drawing Sheets

CONNECTED ASSEMBLY OF TWO SHAFTS AND A CLUTCH HOUSING

BACKGROUND OF THE INVENTION

1. Field of the Invention

This invention relates generally to joining two shafts and a clutch hub.

2. Description of the Prior Art

In an automatic transmission a main shaft can be formed with multiple, angularly spaced, axial fluid passages for carrying actuating pressure to various control elements, such as clutches and brakes located at axially spaced locations along the shaft.

These passages must be machined in the shaft.

A need exists in the industry for a technique that enables forming the passages in the shaft without increasing the diameter of the shaft excessively. The technique must maintain the structural integrity of a one-piece shaft and introduce no whirling due to rotating inertia.

SUMMARY OF THE INVENTION

An assembly of transmission components includes a first shaft including first and second surfaces, axial cutting-spline teeth on the second surface, a second shaft connected by a press fit to first shaft, and a clutch hub connected by a press fit to the second shaft and engaged with the cutting-spline teeth.

A method for connecting the components includes (a) forming a first shaft having first and second surfaces and cutting spline teeth on the second surface, (b) producing a press fit connection between a second shaft and the first surface, (c) producing a press fit connection between the second shaft and a clutch hub, and (d) forcing the cutting spline teeth to cut teeth in the clutch hub and to remain engaged with said cut teeth.

The connections enable ease of shaft manufacture, and provide torsional and axial continuity and structural rigidity comparable to those of a one-piece shaft.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
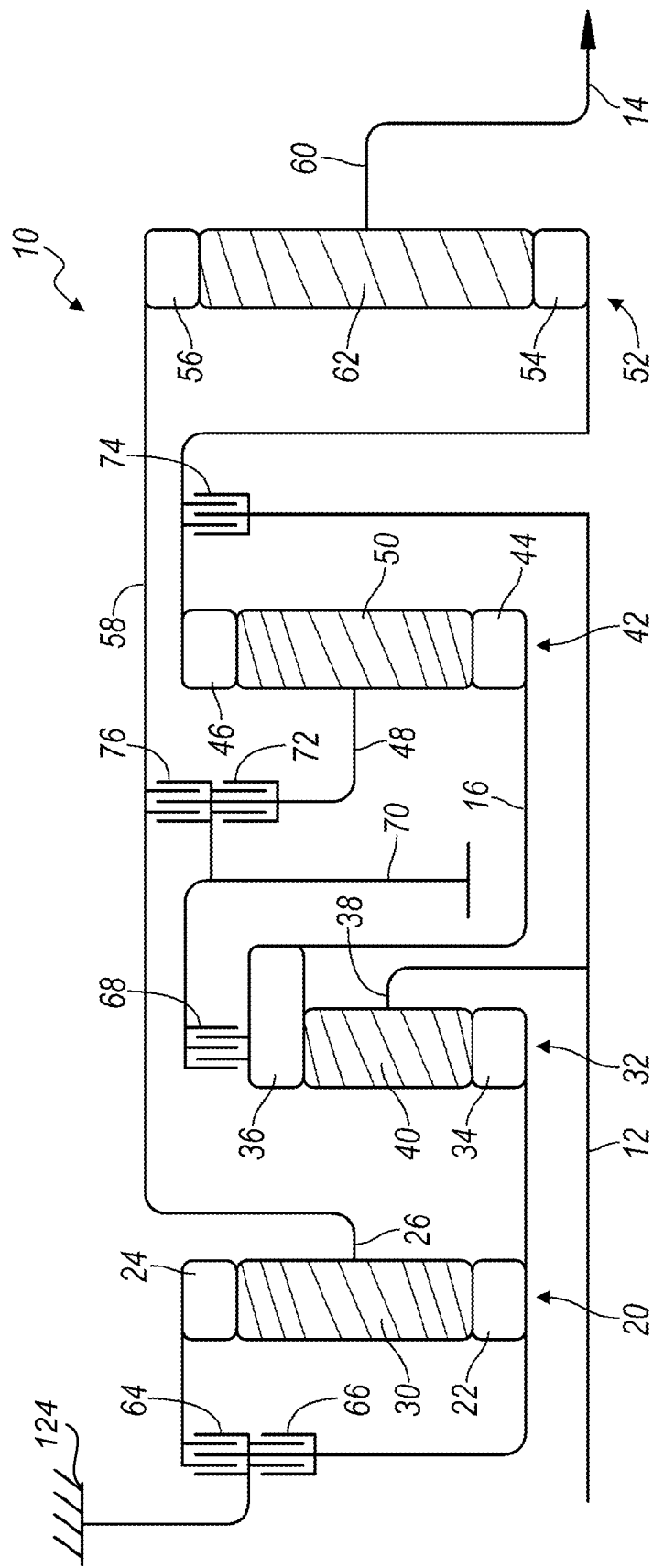
FIG. 1 is a schematic diagram showing a side view of the kinematic assembly for an automatic transmission for a motor vehicle.

The assembly 10 FIG. 1 includes an input 12; output 14; intermediate shaft 16; a first planetary gear set 20 having a first sun gear 22, a first ring gear 24, a first carrier 26; and a set of planet pinions 30 supported on carrier 26 and in continuous meshing engagement with the sun gear 22 and the ring gear 24.

A second planetary gear set 32 includes a second sun gear 34 fixedly coupled to sun gear 22; a second ring gear 36; a second carrier 38 fixedly coupled to the input 12; and a set of planet pinions 40 in supported on carrier 38 and in continuous meshing engagement with sun gear 34 and ring gear 36.

A third planetary gear set 42 includes a third sun gear 44 fixedly coupled to ring gear 36; a third ring gear 46; a third carrier 48; and a set of planet pinions 50 supported on carrier 48 and in continuous meshing engagement with sun gear 44 and ring gear 46.

A fourth planetary gear set 52 includes a fourth sun gear 54 fixedly coupled to ring gear 46; a fourth ring gear 56 fixedly coupled by a shell 58 to carrier 26; a fourth carrier 60 fixedly coupled to output 14; and a set of planet gears 62 supported on carrier 60 and in continuous meshing engagement with sun gear 54 and ring gear 56.

A first brake 64 selectively holds ring gear 24 against rotation.

A second brake 66 selectively holds sun gears 22, 34 against rotation on the transmission case 124.

A first clutch 68 selectively couples ring gear 36 to a clutch housing 70, which can rotate relative to the transmission case 124.

A second clutch 72 selectively couples carrier 48 to clutch housing 70.

A third clutch 74 selectively couples ring gear 46 to input 12.

A fourth clutch 76 selectively couples shell 58 to clutch housing 70.

Figure 2:
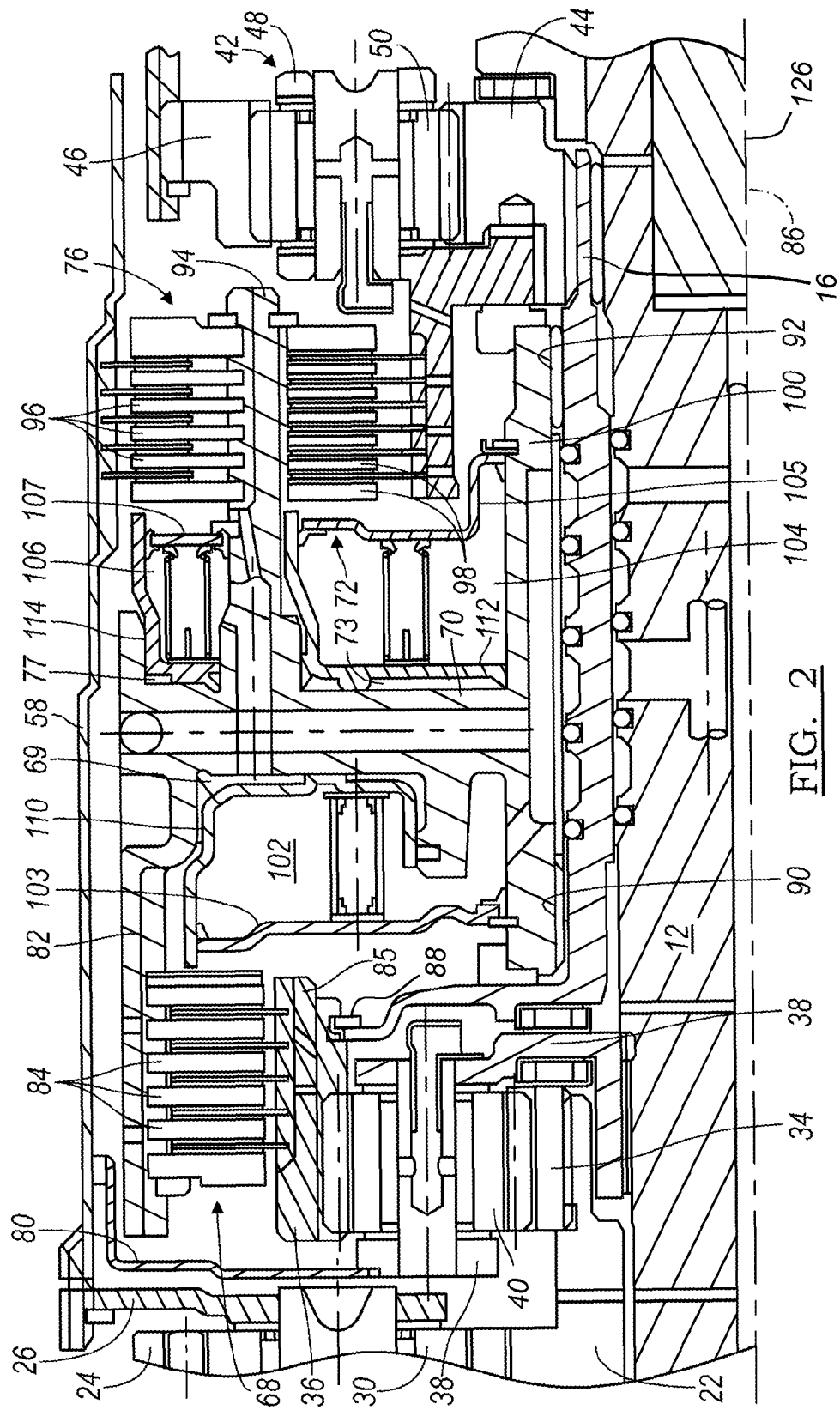
FIG. 2 is a cross section of the kinematic assembly of FIG. 1.

FIG. 2 shows that carrier 38 is secured by a disc 80 to shell 58.

Clutch housing 70 includes an axial arm 82 formed with internal spline teeth, to which external teeth on the spacer plates 84 of clutch 68 are fixed for rotation with clutch housing 70. The friction plates of clutch 68 are splined to external spline teeth formed on a ring 85, which is formed with ring gear 36.

Intermediate shaft 16, which extends along axis 86 on the radial outer side of input 12, is secured to ring 85 where a snap ring 88 completes the connection. Clutch housing 70 is supported by axially spaced bushings 90, 92 on the radial outer surface of intermediate shaft 16.

Clutch housing 70 includes another axial arm 94 formed with external spline teeth, to which internal teeth on the spacer plates 96 of clutch 76 are fixed for rotation with clutch housing 70. The friction plates of clutch 76 are splined to internal spline teeth formed on a shell 58.

External teeth on the spacer plates 98 of clutch 72 engage internal spline teeth formed on arm 94 of the clutch housing 70. The friction plates of clutch 72 are splined to external spline teeth formed on carrier 48.

Located between bushings 90, 92 and formed in the hub 100 of clutch housing 70 are four feed circuits. A single balance oil feed supplies automatic transmission fluid (ATF) to the pressure balance volumes 102, 104, 106 of clutches 68, 72, 76. Balance dams 103, 105, 107 seal the pressure balance volumes 102, 104, 106 at the pistons 110, 112, 114 of the clutches 68, 72, 76.

Each of the servo cylinders 69, 73, 77 of clutches 68, 72, 76 is supplied with actuating pressure through individual circuits formed in the clutch housing 70. When no actuating pressure is applied to clutches 68, 72, 76, the clutch housing 70 has no fixed connection to any other component of assembly 10.

The transmission case 124 contains the kinematic assembly.

Figure 3:
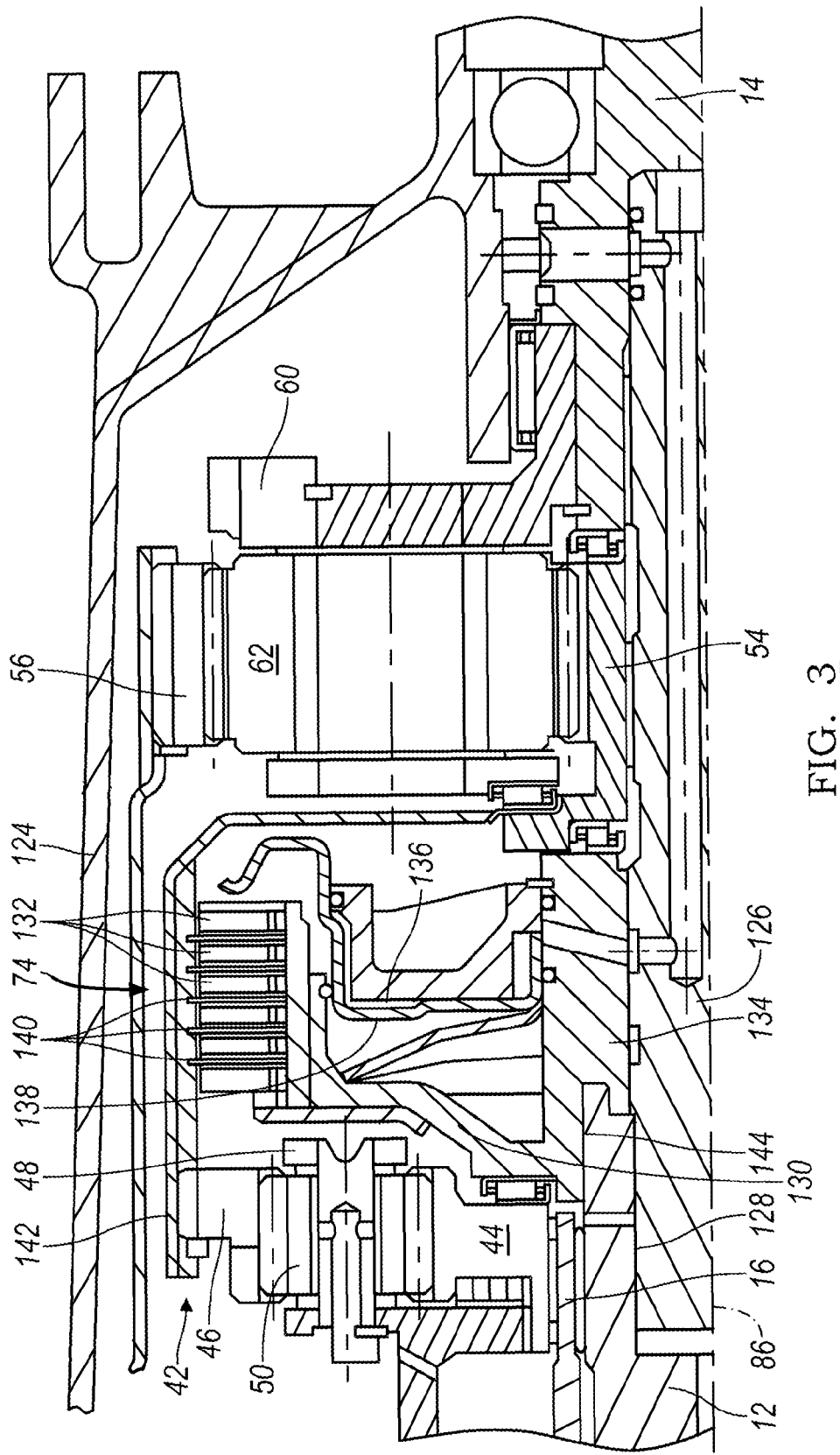
FIG. 3 is a cross section of the kinematic assembly showing connections among the input shaft, a shaft extension and a clutch hub.

FIG. 3 shows that input shaft extension 126 is piloted on an inner surface 128 of an input shaft 12 into press-fit engagement with the input shaft, which overlaps the input shaft extension 126. The press-fit provides torsional continuity between input shaft extension 126 and input shaft 12.

Clutch 74 includes a clutch housing 130, which is splined to the spacer plates 132 and includes a hub 134, which overlaps the input shaft extension 126. The clutch housing 130 is formed with a cylinder 136 containing a piston 138. When clutch-apply pressure is present in cylinder 136, piston 138 forces the spacer plates 132 into frictional engagement with the friction plates 140, which are splined on the shell 142.

The hub 134, input shaft extension 126 and input shaft 12 are connected mutually. The input shaft extension 126 is piloted into position by moving along axis 86 in contact with the inner surface 128 of input shaft 12 forming a press-fit connection.

Hub 134 is piloted on an outer surface of the input shaft extension 126 into press-fit engagement with the input shaft extension.

Preferably input shaft 12 is of steel, and hub 134 is of aluminum or cast iron, or a softer metal than steel. External cutting-spline teeth 144 are formed on the on the outer surface of input shaft 12. As the hub is piloted axially on the outer surface of the input shaft extension 126 to its assembled position the external cutting-spline teeth 144 form mating internal spline teeth on the mating cylindrical surface of the hub 134, shown in FIG. 3. The mutually engaged spline teeth provide torsional continuity between hub 134 and input shaft 12.

In accordance with the provisions of the patent statutes, the preferred embodiment has been described. However, it should be noted that the alternate embodiments can be practiced otherwise than as specifically illustrated and described.

The invention claimed is:

1. A method for connecting components, comprising:
    (a) forming a first shaft having first and second surfaces with cutting-spline teeth on the second surface;
    (b) producing a press fit connection between a second shaft and the first surface;
    (c) producing a press fit connection between the second shaft and a clutch hub;
    (d) forcing the cutting-spline teeth to cut teeth in the clutch hub and to remain engaged with said cut teeth.

2. The method of claim 1, wherein step (a) further comprises forming the cutting-spline teeth of metal and forming the clutch hub of metal having a hardness less that a hardness of the cutting-spline teeth.

3. The method of claim 1, wherein step (b) further comprises using the first surface to pilot axial displacement of the second shaft relative to the first shaft.

4. The method of claim 1, wherein step (c) further comprises using a surface of the second shaft to pilot axial displacement of the clutch hub relative to the first shaft.

5. The method of claim 1, wherein step (d) further comprises using a surface of the second shaft to pilot axial displacement of the clutch hub relative to the cutting-spline teeth.

6. The method of claim 1, further comprising:
    forming the clutch hub with an inner diameter;
    forming the cutting-spline teeth on the second surface having a larger outer diameter than the inner diameter, such that the cutting-spine teeth interfere with the inner diameter.

7. An assembly of transmission components, comprising:
    a first shaft including first and second surfaces, and axial cutting-spline teeth on the second surface;
    a second shaft connected by a press fit to first shaft;
    a clutch hub connected by a press fit to the second shaft and engaged with the cutting-spline teeth.

8. The assembly of claim 7, wherein the first surface is located at radial inner surface of the first shaft, and the cutting-spline teeth extend radially outward from the second surface.

9. The assembly of claim 7, wherein a radial outer surface of the second shaft is connected by a press fit to a radial inner surface of the first shaft.

10. The assembly of claim 7, wherein a radial outer surface of the second shaft is connected by a press fit to a radial inner surface of the clutch hub.

11. The assembly of claim 7, wherein:
    the cutting spline teeth are formed of metal; and
    the clutch hub is formed of metal having a hardness less that a hardness of the cutting-spline teeth.

12. The assembly of claim 7, wherein;
    the cutting-spline teeth are formed of steel; and
    the clutch hub is formed of aluminum having a hardness less that the steel.

13. An assembly of components, comprising:
    a first shaft including first radial inner surface, and axial cutting-spline teeth on a radial outer second surface;
    a second shaft including a third radial outer surface connected by a press fit to first radial inner surface;
    a clutch hub including fourth and fifth radial inner surfaces, the fourth surface connected by a press fit to the second shaft, and the fifth radial inner surface engaged with the cutting-spline teeth.

14. The assembly of claim 13, wherein the cutting-spline teeth extend radially outward from the second surface.

15. The assembly of claim 13, wherein:
    the cutting-spline teeth are formed of metal; and
    the clutch hub is formed of metal having a hardness less that a hardness of the cutting-spline teeth.

16. The assembly of claim 13, wherein;
    the cutting spline teeth are formed of steel; and
    the clutch hub is formed of aluminum having a hardness less that the steel.

* * * * *